United States Patent
Schwarz

(10) Patent No.: US 7,409,793 B1
(45) Date of Patent: Aug. 12, 2008

(54) WATERFOWL DECOY ACCESSORY

(76) Inventor: Walter Jack Schwarz, P.O. Box 116, Monetta, SC (US) 29105

( * ) Notice: Subject to any disclaimer, the term of this patent is extended or adjusted under 35 U.S.C. 154(b) by 0 days.

(21) Appl. No.: 11/710,505

(22) Filed: Feb. 26, 2007

(51) Int. Cl.
*A01M 31/06* (2006.01)
(52) U.S. Cl. .................................................. 43/3
(58) Field of Classification Search ............... 43/2, 43/3
See application file for complete search history.

(56) References Cited

U.S. PATENT DOCUMENTS

| | | | | |
|---|---|---|---|---|
| 230,600 | A * | 8/1880 | Allen | 43/3 |
| 244,038 | A * | 7/1881 | Danz, Jr. | 43/3 |
| 282,851 | A * | 8/1883 | Danz, Jr. | 43/3 |
| 470,564 | A * | 3/1892 | Henderson et al. | 43/3 |
| 575,283 | A * | 1/1897 | Frantz | 43/3 |
| 673,846 | A * | 5/1901 | Rauert | 43/3 |
| 677,118 | A * | 6/1901 | Coudon | 43/3 |
| 694,732 | A * | 3/1902 | Coudon | 43/3 |
| 710,433 | A * | 10/1902 | Coudon | 43/3 |
| 722,682 | A * | 3/1903 | Dills | 43/3 |
| 760,683 | A * | 5/1904 | Coudon | 43/3 |
| 796,147 | A * | 8/1905 | Reynolds | 43/3 |
| 883,161 | A * | 3/1908 | Rosentreter | 43/3 |
| 1,062,713 | A * | 5/1913 | Johnson | 43/3 |
| 1,183,567 | A * | 5/1916 | Johnson | 43/3 |
| 1,185,164 | A * | 5/1916 | Batcher | 43/3 |
| 1,299,896 | A * | 4/1919 | Anderson | 43/3 |
| 1,376,282 | A * | 4/1921 | Kauffman | 43/3 |
| 1,589,065 | A * | 6/1926 | Gere et al. | 43/42.27 |
| 1,613,941 | A * | 1/1927 | Churus | 446/164 |
| 1,746,640 | A * | 2/1930 | Emoff | 43/3 |
| 2,043,827 | A * | 6/1936 | Breuer | 43/3 |
| 2,437,604 | A * | 3/1948 | Hufford | 43/3 |
| 2,439,710 | A * | 4/1948 | Banigan | 43/3 |
| 2,466,626 | A * | 4/1949 | Valasek | 43/3 |
| 2,483,680 | A * | 10/1949 | Timm et al. | 43/3 |
| 2,536,736 | A * | 1/1951 | Gazalski | 43/3 |
| 2,590,842 | A * | 4/1952 | Colgan | 43/3 |
| 2,622,360 | A * | 12/1952 | Bertram | 43/3 |
| 2,680,921 | A * | 6/1954 | Gowland | 428/13 |
| 2,747,316 | A * | 5/1956 | Benedetto | 43/3 |
| 2,763,952 | A * | 9/1956 | Bruce | 43/3 |
| 2,783,572 | A * | 3/1957 | Rohan | 43/3 |
| 3,021,635 | A * | 2/1962 | Sheridan | 43/3 |
| 3,115,721 | A * | 12/1963 | Story | 43/3 |
| 3,435,550 | A * | 4/1969 | Carlson | 43/3 |
| 3,478,459 | A * | 11/1969 | Gazalski | 43/3 |
| 4,228,977 | A * | 10/1980 | Tanaka | 43/2 |

(Continued)

FOREIGN PATENT DOCUMENTS

EP        1179296 A2 *  2/2002

(Continued)

*Primary Examiner*—Darren W Ark
(74) *Attorney, Agent, or Firm*—Richard C. Litman

(57) ABSTRACT

An accessory for a waterfowl decoy, which attachment simulates the wake of a swimming fowl, thus creating the illusion of movement. The attachment is a three-part device including a hollow first member made of molded plastic. A slot is disposed in the plastic member for receiving the keel of the decoy. Two identical, elongate parts are removably connected to the plastic member. The two identical parts are also hollow and are configured in a manner to give the appearance of a wake when immersed in water and viewed from a distance.

5 Claims, 3 Drawing Sheets

U.S. PATENT DOCUMENTS

| | | | |
|---|---|---|---|
| 4,607,447 A * | 8/1986 | Wright | 43/3 |
| 4,658,530 A * | 4/1987 | Ladehoff | 43/3 |
| 4,757,630 A * | 7/1988 | Torberg | 43/3 |
| 4,885,861 A * | 12/1989 | Gazalski | 43/3 |
| 5,191,730 A * | 3/1993 | Balmer | 43/3 |
| 5,832,650 A * | 11/1998 | Franceschini | 43/3 |
| 6,095,458 A * | 8/2000 | Cripe | 43/3 |
| 6,470,620 B1 * | 10/2002 | Acker | 43/3 |
| 6,574,903 B2 * | 6/2003 | Solomon | 43/3 |
| 7,337,575 B2 * | 3/2008 | Hulley et al. | 43/3 |
| 2003/0226307 A1 * | 12/2003 | Hulley et al. | 43/3 |
| 2005/0022440 A1 * | 2/2005 | Pinkston | 43/3 |
| 2005/0108918 A1 * | 5/2005 | Franceschini | 43/3 |
| 2005/0252067 A1 * | 11/2005 | Wade | 43/3 |
| 2005/0268522 A1 * | 12/2005 | Foster et al. | 43/3 |
| 2006/0162228 A1 * | 7/2006 | Sieman | 43/3 |
| 2006/0218842 A1 * | 10/2006 | Wabnitz | 43/3 |
| 2007/0051029 A1 * | 3/2007 | Ring | 43/2 |
| 2007/0289193 A1 * | 12/2007 | Alexander | 43/3 |

FOREIGN PATENT DOCUMENTS

| | | | |
|---|---|---|---|
| GB | 2067064 A | * | 7/1981 |
| GB | 2189124 A | * | 10/1987 |
| GB | 2295953 A | * | 6/1996 |

* cited by examiner

WATERFOWL DECOY ACCESSORY

BACKGROUND OF THE INVENTION

1. Field of the Invention

The present invention generally relates to recreational accessories. More specifically, the present invention is drawn to an accessory for a waterfowl decoy.

2. Description of the Related Art

Waterfowl hunters and/or photographers are always seeking better means to attract ducks, geese and other waterfowl to a desired location. The decoy has been one of the most efficient devices in accomplishing the attraction. It is obvious that the more realistic the decoy, the better the chance of attracting large quantities of waterfowl. A decoy that simulates realistic waterfowl movement would certainly be a welcome addition to the art. Thus, a decoy having an attachment that realistically simulates the wake of a swimming waterfowl would be desired.

The related art is awash with realistic looking decoys. Pertinent examples of such related art are cited and identified in the accompanying IDS. However, none of the cited and identified related art, taken either singly or in combination, is seen to describe a decoy having a wake simulating attachment as will be subsequently disclosed and claimed in the instant invention.

SUMMARY OF THE INVENTION

The present invention is an accessory for a waterfowl decoy, which accessory simulates the wake of a swimming fowl, thus creating the illusion of movement. The accessory is a three-part device including a first, hollow member made of molded plastic. A slot is disposed in the plastic member for receiving the keel of the decoy. Two identical, elongate parts are removably connected to the plastic member. The two identical parts are also hollow and are configured in a manner to give the appearance of a wake when immersed in water and viewed from a distance.

Accordingly, the invention presents an accessory that is portable, lightweight and easily adaptable to most conventional decoys. The invention adds an illusion of movement to an otherwise static decoy. The invention provides for improved elements thereof in an arrangement for the purposes described that are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
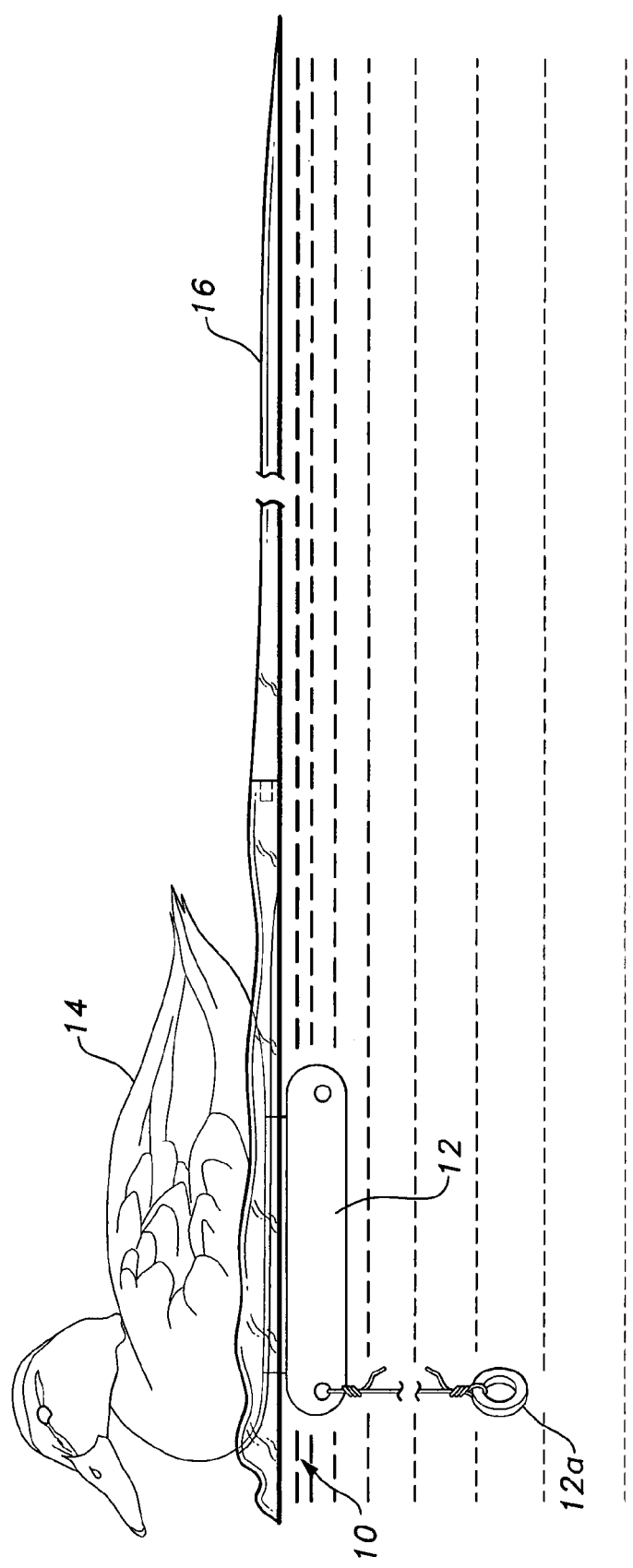
FIG. 1 is an environmental, perspective view of a waterfowl decoy accessory according to the present invention.
Figure 2:
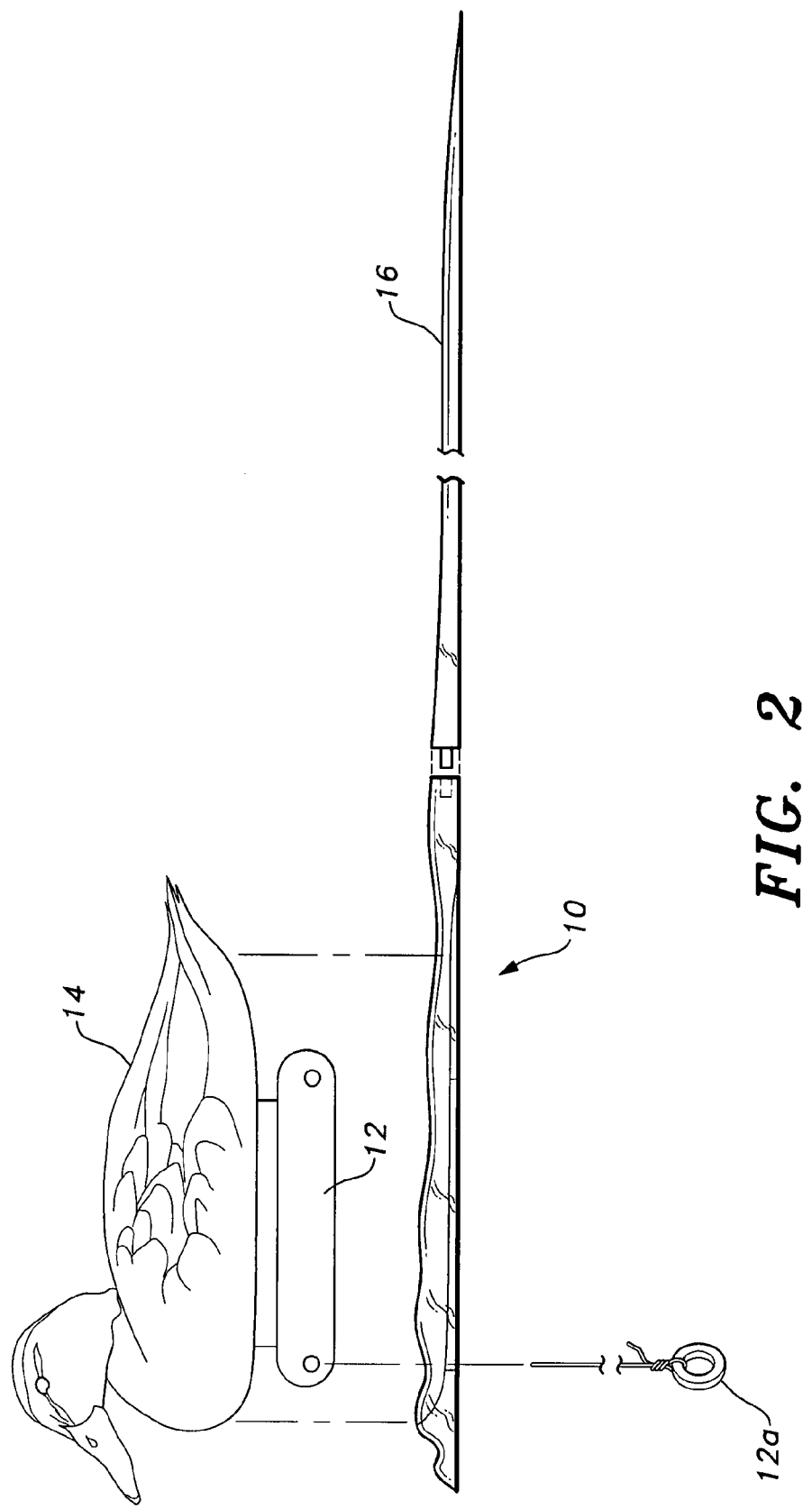
FIG. 2 is a partial, exploded view of a waterfowl decoy accessory according to the present invention.
Figure 3:
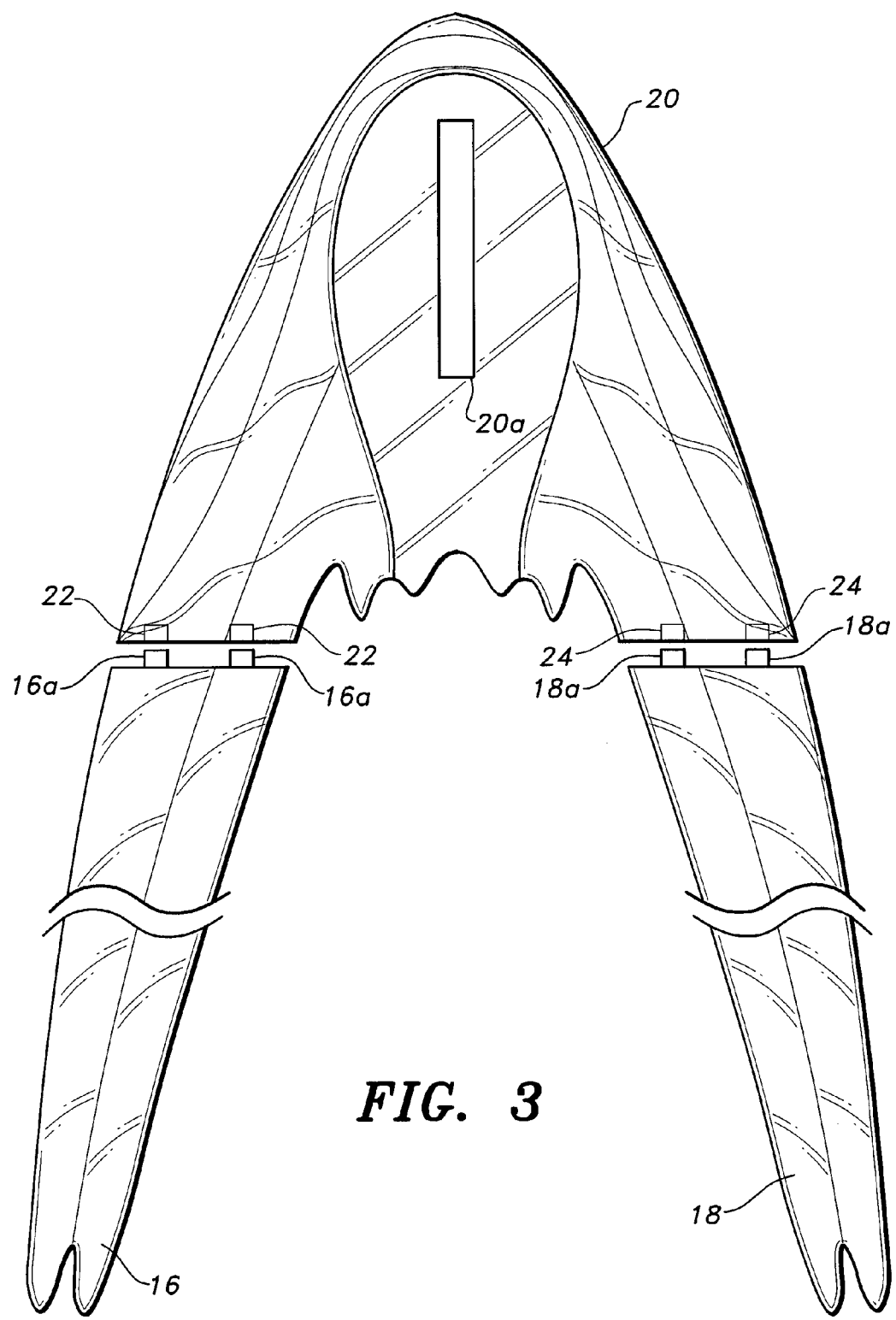
FIG. 3 is an exploded view of a waterfowl decoy accessory according to the present invention.

Attention is first directed to FIG. 1 wherein the accessory of the present invention, generally indicated at 10, is shown mounted to the keel 12 of a waterfowl decoy 14. An anchor member 12a is removably attached to the keel. When viewed from a distance, members 16 and 18 (shown in FIG. 3) of accessory 10 give the appearance of a wake, thereby creating an illusion of swimming by the decoy. As indicated above, this illusion gives a more realistic look to the decoy, thereby attracting other waterfowl to the area. As best seen in FIGS. 2 and 3, accessory 10 is a three-part device that includes identically configured wake-simulating members 16, 18 and a hollow, winged-shaped member 20. Wake simulating members 16, 18 are fabricated from hollow, thin plastic material. As contemplated, each wake-simulating member will be approximately thirty-six inches long and approximately two inches wide. The proximate ends of each member 16, 18 terminate in respective male extensions 16a, 18a whose functions will be explained below. Member 20 is provided with a slot 20a, which slot is designed to receive the keel 12 of decoy 14. Respective openings 22, 24 are disposed on the ends of member 20. Openings 22, 24 are designed to receive and removably retain male extensions 16a, 18a therein.

It is to be understood that the present invention is not limited to the embodiment described above, but encompasses any and all embodiments within the scope of the following claims.

I claim:

1. A waterfowl decoy and accessory in combination, comprising:

a waterfowl decoy, said decoy being hollow and floatable and simulating a swimming waterfowl, said decoy having a keel;

an accessory comprising:

a first member, said first member being hollow and having a first end and a second end;

a slot disposed in said first member, wherein said keel is positioned in said slot;

an elongate second member, said elongate second member being hollow and having a proximate end, said second member being floatable and extending rearward from said first member thereby simulating at least a portion of a wake created by a swimming waterfowl;

structure for removably attaching said elongate second member to said first end of said first member, said structure for removably attaching includes a male extension member disposed on said proximate end of said elongate second member and an opening disposed on said first end of said first member to receive said male extension member on said proximate end of said elongate second member;

an elongate third member, said elongate third member being hollow and having a proximate end, said third member being floatable and extending rearward from said first member thereby simulating at least a portion of a wake caused by a swimming waterfowl; and structure for removably attaching said elongate third member to said second end of said first member, said structure for removably attaching includes a male extension member disposed on said proximate end of said elongate third member and an opening disposed on said second end of said first member to receive said male extension member on said proximate end of said elongate third member, wherein said second and third members are laterally spaced apart thereby simulating the wake of a swimming waterfowl thus creating the illusion of movement.

2. The waterfowl decoy and accessory combination according to claim 1, wherein said first member is fabricated from plastic material.

3. The waterfowl decoy and accessory combination according to claim 1 wherein said elongate second member and said elongate third member are identically configured.

4. The waterfowl decoy and accessory combination according to claim 1, wherein said first member, said elongate second member and said elongate third member are fabricated from plastic material.

5. The waterfowl decoy and accessory combination according to claim 1, wherein said elongate second member and said elongate third member are identically configured and wherein each has a length of approximately thirty six inches and a width of approximately two inches.

* * * * *